United States Patent [19]
Chen et al.

[11] Patent Number: 4,711,186
[45] Date of Patent: Dec. 8, 1987

[54] REFRACTORY ANCHOR

[75] Inventors: Te H. Chen, Florham Park; Dominic Cicchino, Morris Plains; Peter J. Shadbolt, Morristown, all of N.J.

[73] Assignee: Exxon Research and Engineering Company, Florham Park, N.J.

[21] Appl. No.: 944,445

[22] Filed: Dec. 22, 1986

[51] Int. Cl.$^4$ .............................................. E04B 1/24
[52] U.S. Cl. .................................... 110/336; 52/378; 52/334; 428/133
[58] Field of Search ................... 428/133; 52/334, 378; 110/339, 340, 336

[56] References Cited
U.S. PATENT DOCUMENTS 2,984,195  5/1961  Duncan .......................... 110/339
4,479,337 10/1984  Crowley .......................... 52/334 X Primary Examiner—Alexander S. Thomas
Attorney, Agent, or Firm—Joseph J. Dvorak

[57] ABSTRACT

The present invention is directed toward an anchor used to retain thin refractory linings in process vessels such as cyclones and the like. In its simplest sense, the anchor of the present invention has a curved central web and curved legs which together have a shape that approximates that of the letter C. The anchor also has straight arms extending outwardly from the central web which together have a shape approximating the letter W. The arms and legs improve the ability of the anchor to control the crack pattern that forms in the refractory after thermal cycling, thereby reducing catalyst ingress or coke formation in the cracks.

9 Claims, 4 Drawing Figures

REFRACTORY ANCHOR

FIELD OF THE INVENTION

This invention relates to improvements in refractory linings for process vessels. More particularly this invention relates to an improved anchor for thin refractory linings for cyclones and the like.

BACKGROUND OF THE ART

It is well known in the art to use refractory linings in process vessels, reactors, conduits, furnaces and the like as a means of thermal insulation. It is also known to use refractory liners in fluidized catalytic reactors and cyclones which are subjected not only to high temperature but also erosive material in order to provide protection against erosive as well as thermal insulation.

Typically, refractory linings are anchored to vessel walls, such as cyclone bodies, by means of a hexagonal steel grating the thickness of which or depth is equal to the thickness or depth of the refractory lining to be deposited on the vessel wall. The disadvantages of such a refractory anchor are well known. They include installation difficulty, preferential erosion of the exposed metal and cost. Thus, a need exits for a refractory anchor which will overcome one or more of the disadvantages of anchors presently in use.

SUMMARY OF THE INVENTION

Basically the present invention is directed toward an anchor used to retain thin refractory linings in process vessels such as cyclones and the like. In its simplest sense, the anchor of the present invention has a curved central web and curved legs which together have a shape that approximates that of the letter C. The anchor also has a straight arms extending outwardly from the central web which together have a shape approximating the letter W. The arms and legs improve the ability of the anchor to control the crack pattern that forms in the refractory after thermal cycling, thereby reducing catalyst ingress or coke formation in the cracks.

These and other features of the invention will be better understood upon a review of the detailed description in light of the accompanying drawings.

DETAILED DESCRIPTION OF THE INVENTION

Figure 1:
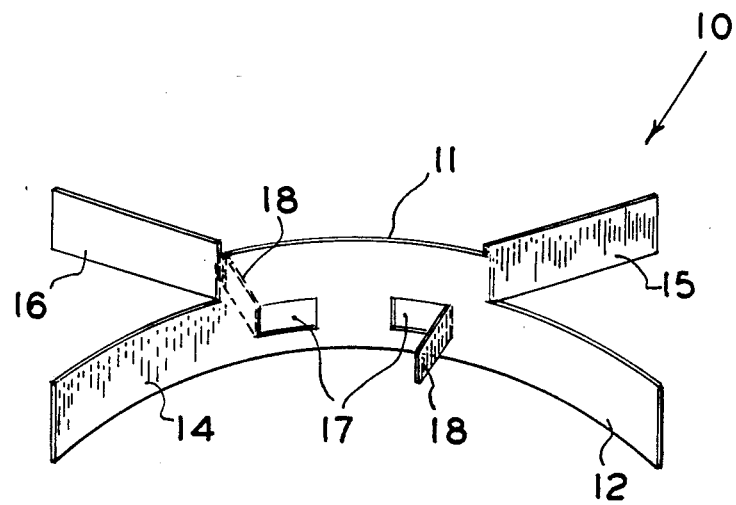
FIG. 1 is a side view partly in perspective of a preferred form of the present invention.
Figure 2:
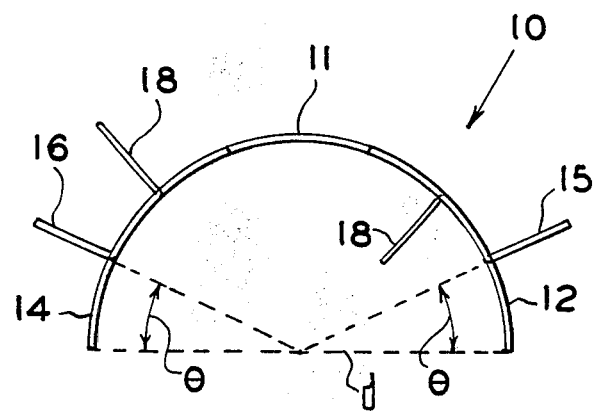
FIG. 2 is a top view of an anchor of the present invention.

Anchor 10, shown particularly in FIGS. 1 and 2, consists of a metal strip having a curved central web portion 11, downwardly curved legs 12 and 14, and upwardly extending straight arms 15 and 16. The anchor 10 of the present invention is particularly adapted for use with thin refractory linings, e.g., linings ranging in thickness from about ¾ to 1 ½ inch and most usually 1 inch. Consequently, the width of the anchor 10 will generally be equivalent to the thickness of the refractory lining, namely, in the range from about ¾ to 1 ½ inch.

As can be seen from FIGS. 1 and 2, the curved central web 11 and legs 12 and 14 when viewed from the top substantially form a semi-circle. The anchor 10 is provided with at least 1 hole and preferably 2 holes 17. The holes are lanced from the central web 11 so as to provide extending tabs 18, one on each side of central web portion 11. The length of the tab or tabs 18 is not critical. In general, the total length of the tabs will be no more than about ⅔ the length of the central web portion 11. Thus, if two tabs 18 are lanced from the web, the combined length of these will be about ⅔ the length of web 11. Also, it should be noted that the tabs 18 are generally rectangular in shape, albeit slightly curved and extend in a plane perpendicular to the surface on which the anchor is to be mounted.

As can be seen, particularly in FIG. 2, the arms 15 and 16 of the anchor 10 extend upwardly and outwardly at a predetermined angle, theta, with respect to the diameter, d, of the semi-circle circumscribed by legs 12 and 14 and web 11. Normally the angle theta will be in the range of about 25° to about 50° and preferably is 35°.

It is particularly preferred in the practice of the present invention that the length of the legs 12 and 14 be substantially equal to the length of the arms 15 and 16. In general, body portion 11 of anchor 10 will have the length from about 1.5 to 5 times the length of arms 15 and 16 and legs 12 and 14.

The width or depth of the arms 15 and 16 and legs 12 and 14 can vary widely. In the practice of the present invention, however, it is preferred that the width of legs 12 and 14 be sufficient that the crack pattern that results in the refractory upon thermal cycling will propagate from the base of the refractory to its surface.

Figure 3:
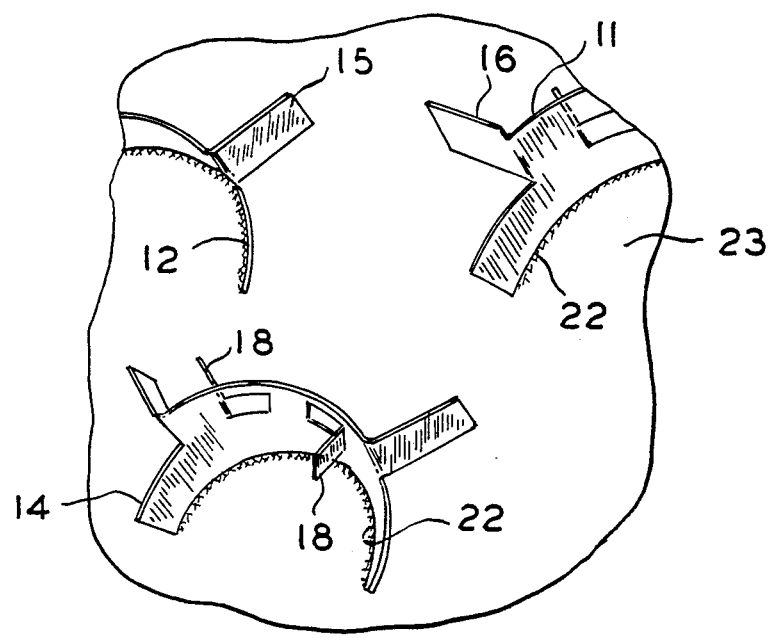
FIG. 3 is a view of several anchors of the present invention mounted against a vessel wall.

Turning now to FIG. 3, the anchor 10 is shown welded by welds 22 to metal surface 23 along the bottom edge 20 of anchor 10. As arranged, the legs 14 and 12 curved downwardly, whereas the arms 15 and 16 extend upwardly. The anchors may, of course, be arranged in any desired pattern and direction.

As indicated, the anchors of the present invention are particularly suitable for use in refractory lined cyclones. Also, as was indicated, the anchors 10 are arranged on the wall of the vessel so that the legs 14 and 15 curve downwardly. Thus, the long dimension of each anchor is basically disposed transverse to the vertical axis of the cyclone barrel.

Figure 4:
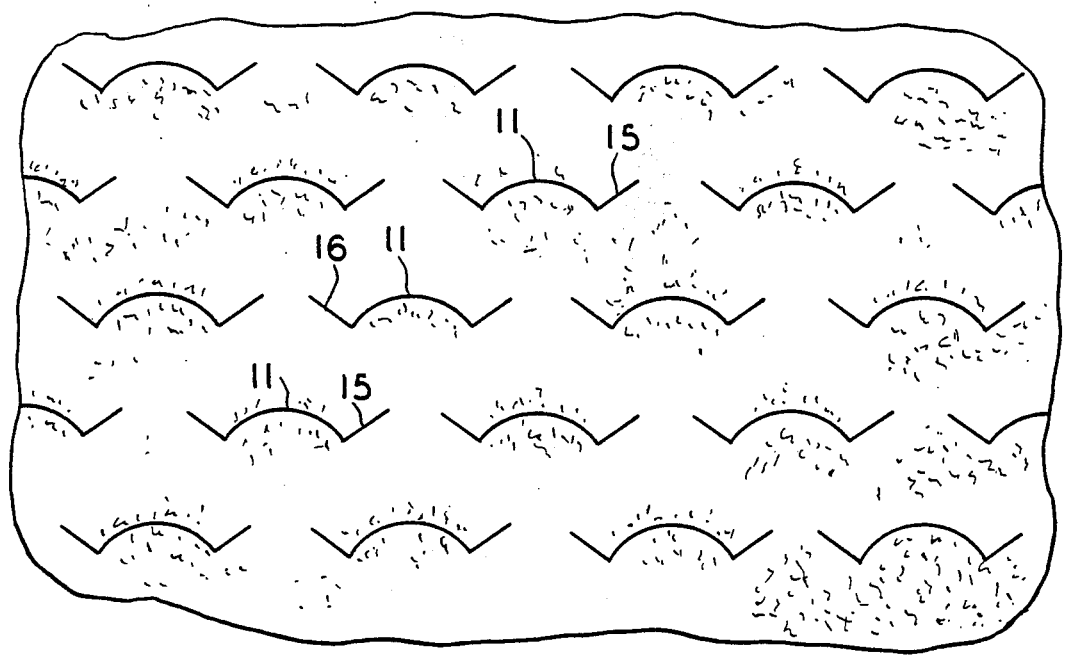
FIG. 4 is a frontal view of a plurality of anchors embedded in and supporting a refractory lining.

Turning in alternating rows to FIG. 4, the anchors 10 are shown spaced apart from each other in alternating rows and disposed in a refractor 42.

It has been found that the anchor of the present invention results in propagation of cracks in the refractory lining after thermal cycling along the arms and legs thereby generating a tiled pattern with the various segments having a shape that is readily retained, particularly when tabs are employed that extend into the segments.

What is claimed is:

1. A composite structure comprising: a metal surface; a refractory lining for providing thermal protection to said surface; and, a plurality of metal anchors welded to said surface in spaced apart relationship for providing crack control of said refractory lining during thermal cycling thereof, each of said anchors having a generally curved central web and curved legs extending from said central web, said central web and said legs defining substantially a semi-circle, straight arms extending upwardly from said curved central web, the total width of said anchor being substantially equal to the thickness of said refractory lining, said arms extending at a predetermined angle with respect to the diameter of said semicircular web and leg portion of said anchor, said anchor having at least 1 hole and tab in said central web.

2. The composite of claim 1 wherein said arms extend at an angle of from about 25° to 50°.

3. The composite of claim 2 wherein said angle is 35°.

4. The composite of claim 3 wherein said anchor has 2 holes and 2 tabs.

5. The composite of claim 4 wherein said web portion is from 1.5 to 5 times the length of said arms and legs.

6. The composite of claim 5 wherein said tab extends outwardly on opposite sides of said central web.

7. The composite of claim 6 wherein the width of said legs is sufficient to permit the crack pattern resulting in the refractory lining on thermal cycling to propagate to the surface of the refractory.

8. A composite structure comprising:
a metal surface;
a refractory lining for providing thermal protection to said surface; and
a plurality of metal anchors welded to said surface in spaced apart relationship for providing crack control of said refractory lining during thermal cycling thereof, each of said anchors having a curved central web and curved legs extending therefrom, said web and legs having a shape approximating the letter C;
straight arms extending outwardly from said central web at an angle of from about 25° to about 50° as measured from the center of a line drawn between the equal points along the length of each of said legs, said central web and said arms having a shape approximating the letter W;
two holes in said central web and two tabs extending outwardly from said central web and on opposite sides thereof, the tabs having a width in a plane perpendicular to the plane of said metal surface.

9. The composite of claim 8 wherein said tabs are longer than they are wide and wherein said tabs are slightly curved.

* * * * *